United States Patent [19]
Kim et al.

[11] Patent Number: 5,463,571
[45] Date of Patent: Oct. 31, 1995

[54] MULTI-NARY OR LOGIC DEVICE

[75] Inventors: Jin-Up Kim; Sun-Young Kim, both of Daejeon, Rep. of Korea

[73] Assignee: Electronics and Telecommunications Research Institute, Rep. of Korea

[21] Appl. No.: 357,245

[22] Filed: Dec. 13, 1994

[30] Foreign Application Priority Data

Nov. 15, 1994 [KR] Rep. of Korea .................. 94-29918

[51] Int. Cl.[6] ........................................... G06F 7/00
[52] U.S. Cl. ........................................ 364/746.2; 364/768
[58] Field of Search ................... 364/746.2, 768; 341/56, 57; 326/59, 60

[56] References Cited

U.S. PATENT DOCUMENTS 3,628,000 12/1971 Weiss ...................................... 364/773
5,280,440 1/1994 Sugimura ............................ 364/746.2

Primary Examiner—Tan V. Mai
Attorney, Agent, or Firm—Larson and Taylor

[57] ABSTRACT

An OR logic operation rule capable of carrying out an OR logic operation between binary digits and an OR logic operation between multi-nary digits is defined and an OR logic device in accordance the OR logic operation is disclosed. The OR logic operator having three multi-nary logic inputs consists two multi-nary OR logic operator having two inputs, respectively. The multi-nary OR logic operator carries out the function of the prior binary OR logic operation and the function of the binary multi-nary OR logic operation.

1 Claim, 4 Drawing Sheets

FIG.1
| OR | 0 | 1 |
|----|---|---|
| 0  | 0 | 1 |
| 1  | 1 | 1 |
FIG.2
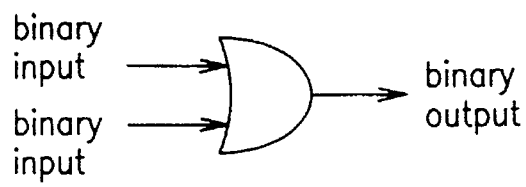
FIG.3
| $\oplus$ | 0  | 1        | ... | j         | ... | A         |
|----------|----|----------|-----|-----------|-----|-----------|
| 0        | 0  | B        | ... | jB        | ... | AB        |
| 1        | A  | A+(B−1)  |     | A+j(B−1)  |     | A+A(B−1)  |
| ⋮        |    | ⋮        |     | ⋮         |     | ⋮         |
| i        | iA | iA+(B−i) |     | iA+j(B−i) |     | iA+A(B−i) |
| ⋮        |    | ⋮        |     | ⋮         |     | ⋮         |
| B        | AB | AB       | ... | AB        | ... | AB        |
FIG.4
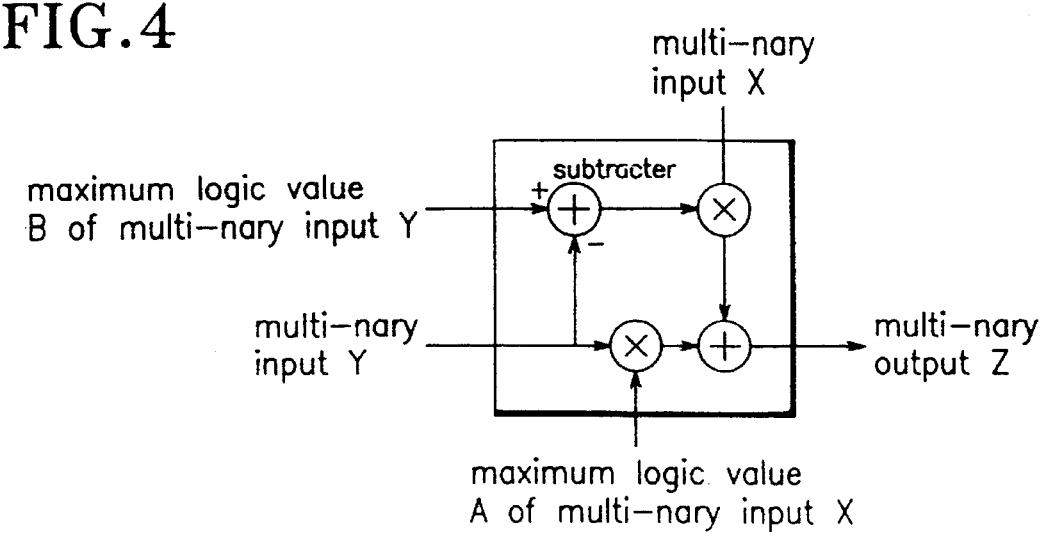

MULTI-NARY OR LOGIC DEVICE

BACKGROUND OF THE INVENTION

The present invention relates to a OR logic device in case where in an OR logic operator has inputs of multi-nary logic signals.

Recently, most of electronic apparatus are based on a digital signal process for processing a signal in digital.

Herein, the digital signal process is a signal process method which processes an analog signal to digital data suitable to the object through an analog to digital converter, thereby obtaining the desired result.

In general, the digital signal is indicated in a binary digit and the logic device for implementing logic operation between the binary digits has been frequently used in a digital signal processing apparatus.

FIG. 1 shows a truth table of a conventional binary logic OR logic operation. A binary OR logic operation symbol is designated as add symbol (+), but the present invention designates it as ($\oplus$) so as to distinguish with an arithmetic symbol (+) and it is illustrated as shown in FIG. 2.

The truth table according to a binary OR logic of FIG. 1 indicates an input and an output of a binary OR logic operator.

Thus, referring to FIG. 2, in case where if two inputs are logic "0", the output becomes logic "0" and in case where two inputs are logic "1" and two inputs are logic "1" and logic "0", respectively, the output becomes "1".

Herein, logic "1" or logic "0" designates a logic value "1" or "0" and actually it is used by mapping with an actual electric signal such as +1 volt, −1 volt.

Said binary OR logic operator is used in most of digital circuits indicating in a series of binary digits.

However, how does the OR logic operator carry out an OR logic operation in case where two inputs of the OR logic operator are not binary logic values.

Actually, as above mentioned the output of the binary OR logic operator with reference to the binary logic value has a binary logic value, but the binary logic value is converted into a multi-nary logic value, after an arithmetic operation such as an arithmetic OR operation of the binary logic value (arithmetic add) or an arithmetic AND operation of the binary logic (arithmetic product) was carried out.

Several binary logic operators should be used to process said multi-nary logic value.

SUMMARY OF THE INVENTION

Accordingly, it is an object of the present invention to define an OR logic operation rule capable of carrying out an OR logic operation between multi-nary logic values as well as an OR logic operation between binary logic values and to provide an OR logic device in accordance with the OR logic operation.

The other objects and features of the present invention can be achieved by providing a multi-nary OR logic device for carrying out the multi-nary OR logic operation of k (herein, k is an integer) binary inputs and one binary input, said k binary inputs and one binary input having the designated bits, respectively, comprising an arithmetic summer for sequentially summing the k binary inputs inputted in bit units, thereby calculating the multi-nary value corresponding to said k binary inputs; and a binary multi-nary OR logic operator for receiving the output of the arithmetic adder and the binary input.

BRIEF DESCRIPTION OF THE DRAWINGS

FIG. 1 is a truth table of a binary OR logic operation.

FIG. 2 shows a binary OR logic operator.

FIG. 3 is a truth table of a multi-nary OR logic operation in accordance with the present invention.

FIG. 4 shows a multi-nary OR logic device in accordance with the truth table of FIG. 3.

DETAILED DESCRIPTION OF THE INVENTION

FIG. 3 shows a truth table of an output Z of a multi-nary OR logic in accordance with the present invention, an case where two multi-nary logic inputs X and Y are operated.

Referring to FIG. 3, it is defined that the input X may have a maximum logic value of A and the input Y may have a maximum logic value of B, respectively.

Thus, the input X may have from a logic value of 0 to a logic value of A and the input B may have from a logic value of 0 to a logic value of B. Herein, A and B are positive integers.

As shown in the truth table of the multi-nary OR logic of FIG. 3, in case where the logic value of the input X is j and the logic value of the input Y is i, the output Z of the multi-nary OR logic becomes iA+j(B−i).

Said multi-nary OR logic operator may have the output value from a logic value of 0 to a logic value of A.

For example, in the truth table of FIG. 3, In case where the value of A is 9 and the value of B is 19, if the input X has the value of 5 and the input Y has the value of 12, J becomes 5 and i becomes 12, so that the logic value of the output Z becomes 1A+j(B−i)= 12*9+5*(19−12)=143.

The logic value of the output Z should be between 0 and AB=9*19=171. A multi-nary OR logic operator having plural inputs can be constructed by use of the OR logic operator having two inputs of multi-nary logic.

FIG. 4 shows a configuration of a multi-nary OR logic operator in accordance with the truth table of FIG. 3.

Figure 5:
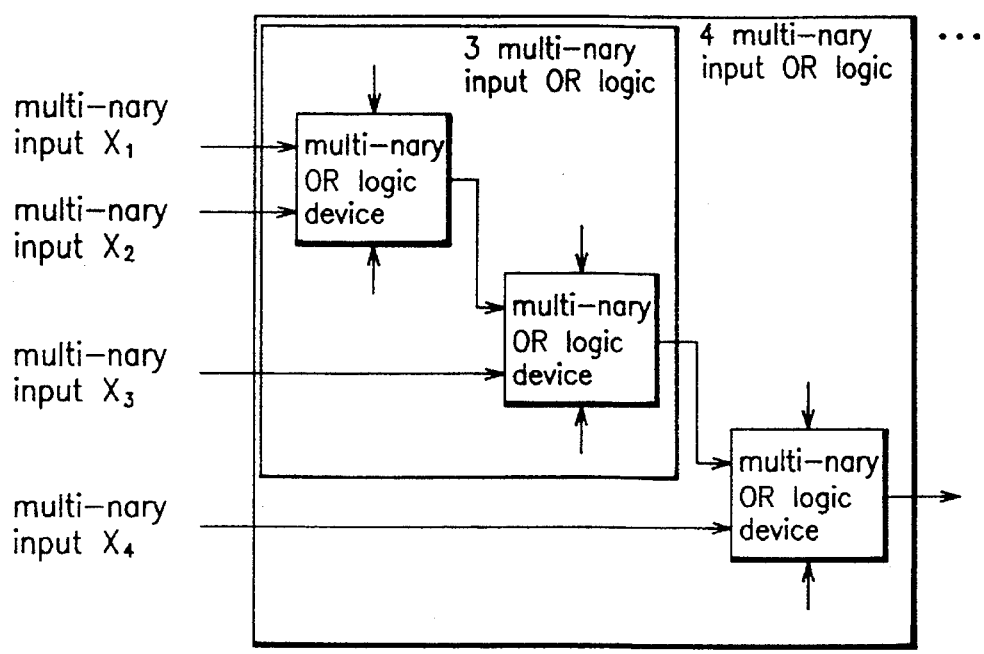
FIG. 5 shows a multi-nary OR logic device having plural multi-nary inputs in accordance with the present invention.

FIG. 5 shows a configuration of a multi-nary OR logic device having three inputs of multi-nary logic, which consists of two multi-nary OR logic operators having two inputs, respectively.

The multi-nary OR logic device includes an operation function of the prior binary OR logic operator as well as an operation function of a binary-multi-nary OR logic operator.

Thus, supposed that above-mentioned multi-nary inputs X and Y are binary inputs, the values of A and B become 1. If it substitutes for A=1, B=1 in the truth table of the multi-nary OR logic as shown in FIG. 3, the same result as the truth table of the binary OR operation logic operator as shown in FIG. 1 can be obtained.

In order to exemplify the use of the multi-nary OR logic operator, it cites an example of the binary-multi-nary OR logic operator that one of two inputs has a binary logic value and the other has a multi-nary logic value.

Figure 6:
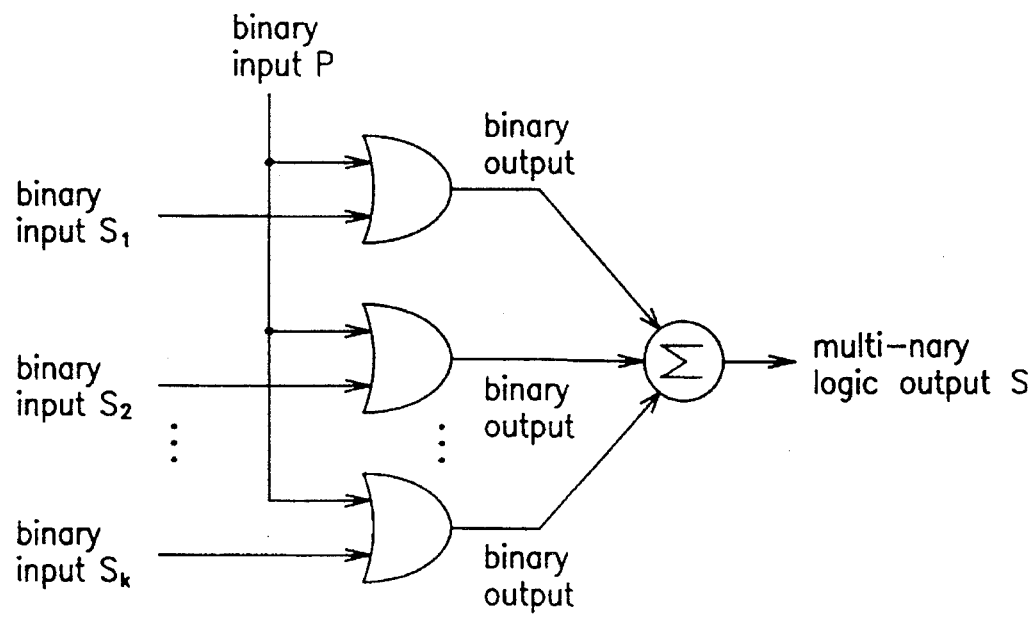
FIG. 6 shows a conventional binary-multi-nary OR logic operator having plural binary inputs in accordance with the present invention.

Refers to FIG. 6 utilizing the prior binary OR logic operator. Herein, if $S_i$ (i=1,2,...,k: k is any positive integer) and the P are binary input signals, the output S of the logic circuit can be expressed as the following equation.

$$S = \sum_{i=1}^{k} (S_i \oplus P) \quad (1)$$

In FIG. 6, one arithmetic summer for arithmetically summing k binary inputs and k OR logic operators are necessary to calculate the foregoing equation.

Figure 7:
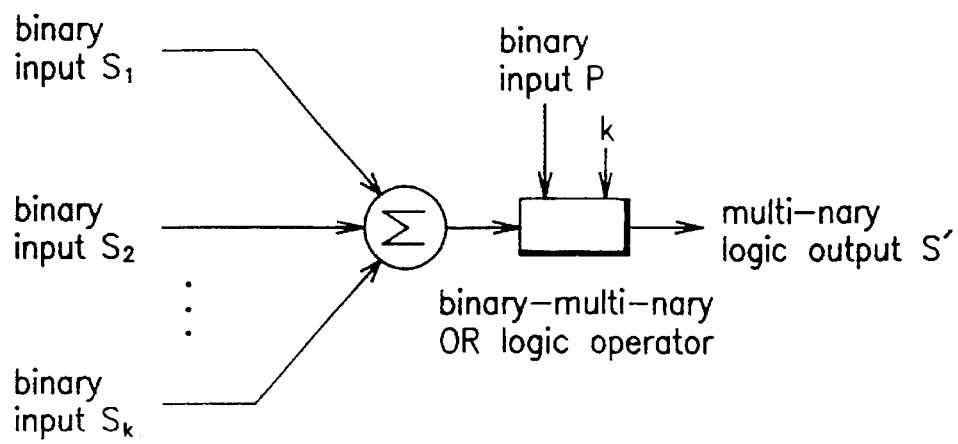
FIG. 7 shows a binary-multi-nary OR logic device in accordance with a first embodiment of the present invention.

In case where one binary-multi-nary OR logic operator is used to calculate the equation (1), as shown in FIG. 7, a logic circuit consists of one binary-multi-nary OR logic operator and one arithmetic summer.

The output of the binary-multi-nary OR logic circuit as shown in FIG. 7 is expressed as the following equation (2).

$$S' = \left( \sum_{i=1}^{k} S_i \right) \boxplus P \quad (2)$$

Herein, $\boxplus$ is defined as an operation symbol of the binary multi-nary OR logic.

Therefore, if the S and S' have the identical values in above two equations, the prior method of FIG. 6 for embodying the digital operation of the equation (1) can be embodied as shown in FIG. 7.

Thus, the combination of the binary OR logic operator can be converted into the binary-multi-nary OR logic operator.

Because the numerical add and the binary OR logic operation are a linear operator, the exchange and distribution rules of the operator are realized, so that the equations can be verified.

In order to verify that the two equations are identical, S and S' are compared in case where k=3 and $S_1$=100110101, $S_2$=011001010, $S_3$=110101100, and P=010110010.

First, the value of S calculated by the equation (1) is as follows.

$$\begin{aligned} S &= (100110101) \oplus (010110010) + (011001010) \oplus \\ &\quad (010110010) + (110101100) \oplus (010110010) \\ &= (110110111) + (011111010) + (110111110) \\ &= (231332231) \end{aligned} \quad (3)$$

Also, the value of S' calculated by the equation (2) as follows.

$$\begin{aligned} S' &= [(100110101) + (011001010) + (1101011100)] \boxplus \\ &\quad (010110010) \\ &= (221212211) \boxplus (010110010) \\ &= (231332231) \end{aligned} \quad (4)$$

Accordingly, it is found that the calculated results from two equation (3) and (4) are identical.

As above mentioned, in case where the prior binary OR logic operation is substituted for the binary-multi-nary OR logic operation, it has an advantage that many binary OR logic operators can be reduced as known by comparing FIGS. 6 and 7.

Although the above example cites the logic circuit consisting of the prior binary OR logic operator and the arithmetic summer, it is applicable to the logic circuit consisting of a binary OR logic operator and an arithmetic multiplier The binary-multi-nary OR logic operator may be regarded as extension of the prior binary OR logic operator that one of two inputs is the multi-nary input.

The above descriptions is disclosed in Korea patent No. 93-25909 and is a method that can reduce many binary OR logic operators by embodying the configuration of the digital circuit related to the prior binary OR logic operator by use of the prior binary-multi-nary OR logic operator.

However, in the binary-multi-nary OR operator, one of two inputs is a binary input and the other is a multi-nary input.

Therefore, it is slightly restricted on application of the binary multi-nary AND logic operator, because one of two inputs is restricted as the binary input.

Accordingly, the present invention proposes the further useful and inclusive method which extends the binary input into the multi-nary input so as to remove the restriction.

If the binary input of the binary-multi-nary OR logic operator is further extended into the multi-nary input, the multi-nary OR logic operator can be constructed as shown in FIGS. 3 and 4.

Hereinafter, it cites an example of the use of multi-nary-multi-nary OR logic operator having two inputs of multi-nary logic based on the logic circuit consisting of a binary-multi-nary OR logic operator. Herein, the case that two inputs are multi-nary, is explained as the multi-nary OR logic operator.

Figure 8:
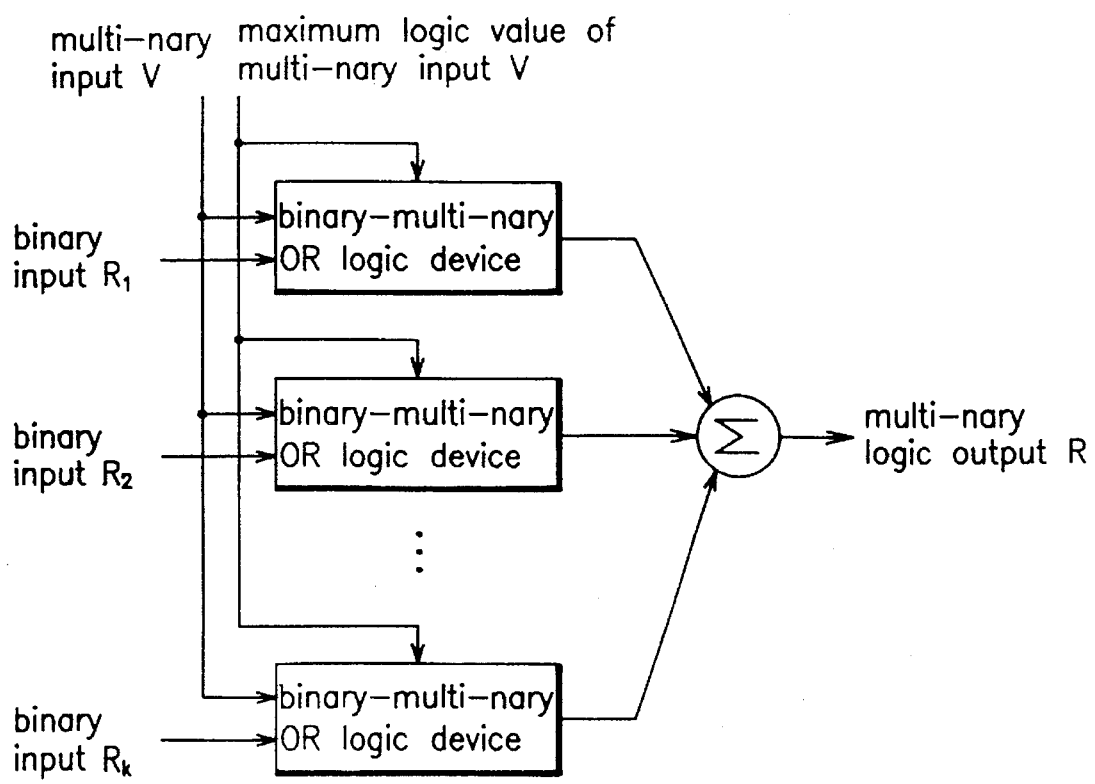
FIG. 8 shows a binary-multi-nary OR logic device in accordance with a second embodiment of the present invention.

It cites the logic circuit utilizing the binary multi-nary OR logic operator of FIG. 8 which has the same configuration as that of FIG. 6.

Herein, when $R_i$ (i=1,2,..., k: k is any positive integer) is a binary input signal and V is a multi-nary input signal, the output R of the logic circuit can be expressed as the following equation.

$$R = \sum_{i=1}^{k} (R_i \boxplus V) \quad (5)$$

Figure 9:
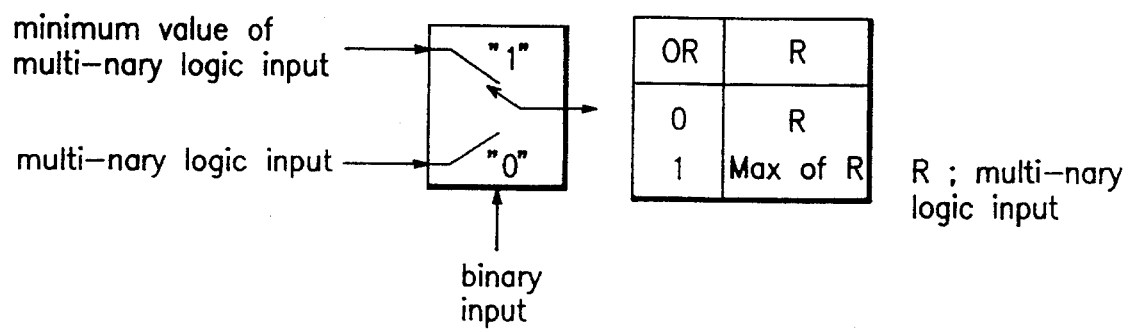
FIG. 9 shows a binary-multi-nary OR logic operator having two multi-nary inputs and a truth table thereof in accordance with the present invention.

Herein, because the logic circuit is based on the binary-multi-nary operator, a truth table of the binary- multi-nary OR logic device as shown in FIG. 9 can be derived from the truth table of the multi-nary OR logic operator of FIG. 3. In particular, as shown in FIG. 9, the binary-multi-nary OR logic device can be constructed simpler than that of the multi-nary OR logic device of FIG. 4

Figure 10:
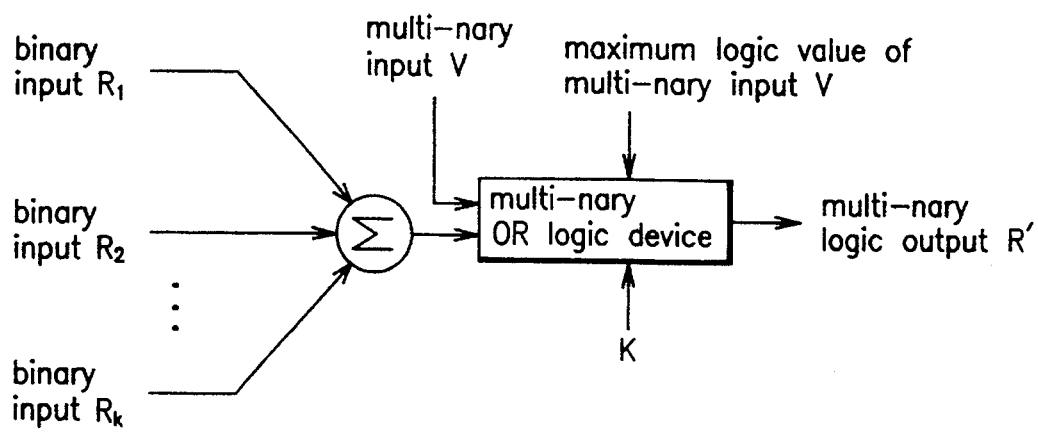
FIG. 10 shows a binary-multi-nary OR logic device in accordance with a third embodiment of the present invention.

In case where the multi-nary OR logic operator is used to calculate the equation (5), as shown in FIG. 10, a logic circuit consists of one multi-nary OR logic operator and one arithmetic summer.

The output of FIG. 10 can be expressed as the following equation (2).

$$R' = \left( \sum_{i=1}^{k} R_i \right) \oplus V \qquad (6)$$

Herein, $\oplus$ is defined as an operation symbol of the multi-nary-multi-nary OR logic.

Therefore, if the R and R' have the identical values in above two equations, the combination of the binary- multinary OR logic operators can be converted into the multi-nary OR logic operator.

Because the arithmetic add and the binary OR logic operation are a linear operator, the exchange and distribution rule of the operator are realized, so that the equations can be verified.

In order to verify that the two equation are identical, R and R' are compared in case where k=3 and $R_1$=100110101, $R_2$=011001010, $R_3$=110101100, V=032521433 and the maximum value of V is 5.

First, the value of R in the equation (5) calculated in accordance with the truth table of FIG. 9 as follows.

$$
\begin{aligned}
R &= (100110101)\boxminus(032521433) + (011001010)\boxminus \\
&\quad (032521433) + (110101100)\boxminus(032521433) \\
&= (532551535) + (055525453) + (552525533) \\
&= (AD9F9BEBB)
\end{aligned}
\qquad (7)
$$

Also, the value of R' of equation (6) is calculated by in accordance with the truth table of the multi-nary OR logic in case of B=3 and A=5 in FIG. 3.

$$
\begin{aligned}
R' &= [(100110101) + (011001010) + (110101100)] \oplus \\
&\quad (032521433) \\
&= (221212211) \oplus (032521433) \\
&= (AD9F9BEBB)
\end{aligned}
\qquad (8)
$$

Accordingly, it is found that the calculated results from two equation (7) and (8) are identical.

According to the present invention, it has many advantage on circuit in case where the multi-nary OR logic device is applied to the logic circuit consisting of the prior binary OR logic operator combined with the arithmetic operator. Thus, the configuration is very simple and an circuit can be economically designed.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A multi-nary OR logic device for carrying out the multi-nary OR logic operation of k (herein, k is an integer) binary inputs having the designated bit, respectively, and one binary input, said k binary inputs and one binary input having the designated bits, respectively, comprising:

an arithmetic summer for sequentially summing the k binary inputs inputted in bit units, thereby calculating the multi-nary value corresponding to said k binary inputs; and a binary multi-nary OR logic operator for receiving the output of the arithmetic summer and the binary input.

* * * * *